US009545059B2

(12) United States Patent
DeMerchant, Jr. et al.

(10) Patent No.: US 9,545,059 B2
(45) Date of Patent: Jan. 17, 2017

(54) ENVIRONMENTALLY CONTROLLED GREENHOUSE WITH INTEGRATED ORGANIC AND SELF-SUSTAINABLE CAPABLE GROW SYSTEM

(71) Applicants: Richard Sutton DeMerchant, Jr., Portland, OR (US); Jeffrey Curtis DeMerchant, Portland, OR (US)

(72) Inventors: Richard Sutton DeMerchant, Jr., Portland, OR (US); Jeffrey Curtis DeMerchant, Portland, OR (US)

(*) Notice: Subject to any disclaimer, the term of this patent is extended or adjusted under 35 U.S.C. 154(b) by 128 days.

(21) Appl. No.: 14/037,362

(22) Filed: Sep. 25, 2013

(65) Prior Publication Data
US 2014/0083000 A1    Mar. 27, 2014

Related U.S. Application Data

(60) Provisional application No. 61/706,064, filed on Sep. 26, 2012.

(51) Int. Cl.
*A01G 9/14*    (2006.01)
*A01G 9/24*    (2006.01)

(52) U.S. Cl.
CPC ............... *A01G 9/14* (2013.01); *A01G 9/247* (2013.01)

(58) Field of Classification Search
CPC ............ A01G 9/14; A01G 9/143; A01G 9/24; A01G 9/247; A01G 209/248
USPC ......... 47/17, 20.1, 21.1, 29.1, 29.6, 39, 48.5
See application file for complete search history.

(56) References Cited

U.S. PATENT DOCUMENTS

| 6,508,033 B2* | 1/2003 | Hessel et al. ............... 47/60 |
| 6,996,932 B2* | 2/2006 | Kruer et al. ............. 47/48.5 |
| 2007/0130824 A1* | 6/2007 | Teich ....................... 47/21.1 |

* cited by examiner

*Primary Examiner* — William Gilbert

(57) ABSTRACT

An environmentally controlled greenhouse and integrated automated grow system that is designed to utilize self-sustainable sources of nutrient/fertilizers or any water-soluble fertilizer/nutrient and capable of producing a wide variety of organic crops concurrently.

3 Claims, 8 Drawing Sheets

ENVIRONMENTALLY CONTROLLED GREENHOUSE WITH INTEGRATED ORGANIC AND SELF-SUSTAINABLE CAPABLE GROW SYSTEM

BACKGROUND OF THE INVENTION

The present invention is in the technical field of Greenhouse Agriculture. More particularly, the present invention is in the technical field of Self-Sustainable Micro-Grid Greenhouse Agriculture.

SUMMARY OF THE INVENTION

The invention is an environmentally controlled, modular greenhouse and integrated automated grow system that is designed to utilize self-sustainable sources of nutrient/fertilizers and capable of producing a wide variety of organic crops concurrently. The system is broken into multiple/plurality of nutrient and irrigation delivery zones, which enables the operator of the system to create the optimum-growing environment for a wide variety of crops. Although capable of delivering any water-soluble nutrient with a high level of accuracy to the plants, the system is designed to deliver organic nutrients that are made or harvested on site by the operator of the system. Examples of this Self-Sustainable source of nutrient could be vermicompost, (harvested worm manure), or seaweed, or any variety of fully composted organic material.

Each grow zone in the system has an automatic "nutrient tea" brewing system that creates a batch of nutrient tea between irrigation cycles through a process of infusion/osmosis and aeration creating an environment to produce beneficial microbial life within the "nutrient tea". This tea is then flushed from the brewing/distribution chamber to each individual plant in the zone when an irrigation cycle begins.

Figure 1:
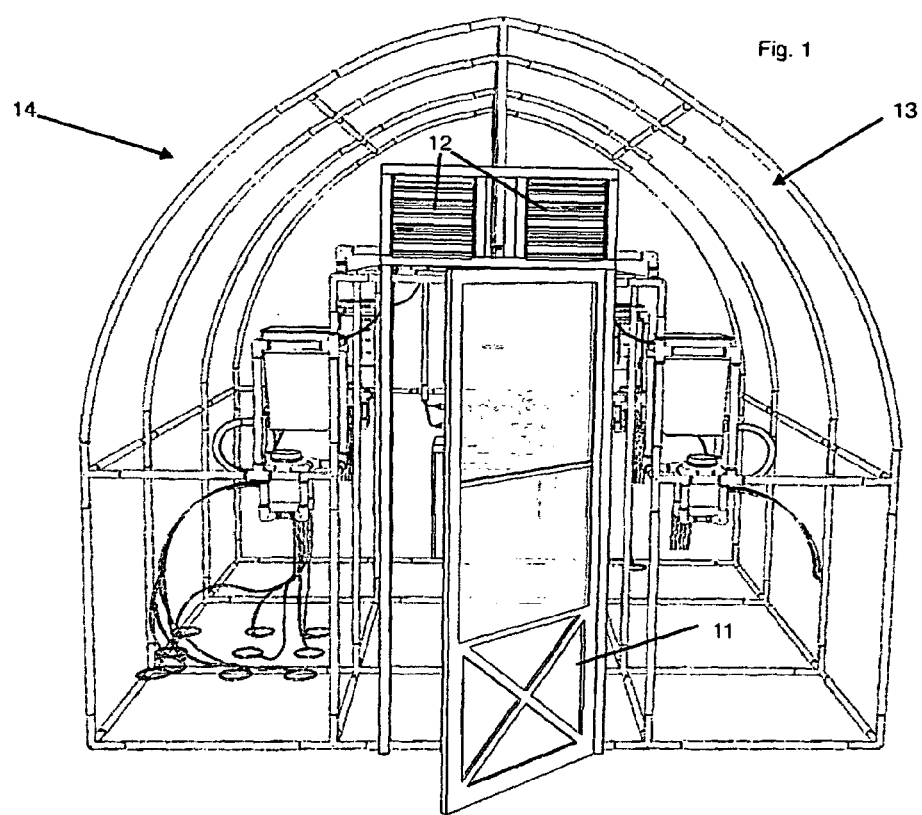
FIG. 1 is a perspective view of the exterior front of the present invention.

REFERENCE NUMERALS 11 door
12 Exhalation Vent
13 cover
14 building skeletal support structure
15 external water hose
16 Variable Power Source Control Unit
17 automated on/off water valves
18 hose splitter for watering wand attachment
19 individual bay Irrigation Lines
20 watering wand
22 individual bay watering line on/off valve
23 water bars
24 reservoir
25 plant food tea brewer and distribution hub
26 reservoir on/off valve
27 reservoir dump hose
28 individual plant feeder lines
29 plant feeder/irrigation rings
30 interior plant resistant flooring
31 tower support structure
33 2×4 Composite door frame
34 2×4 vent frame and door frame cap
35 plant tea brewer/infuser capsule
36 plant feeder/irrigation ring Clasp
37 plant feed/irrigation ring water spout
38 Galvanized Metal Internal Tubing
39 Galvanized Steel Adjustable Joints
40 Structural PVC

DETAILED DESCRIPTION

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

FIG. 1

Figure 2:
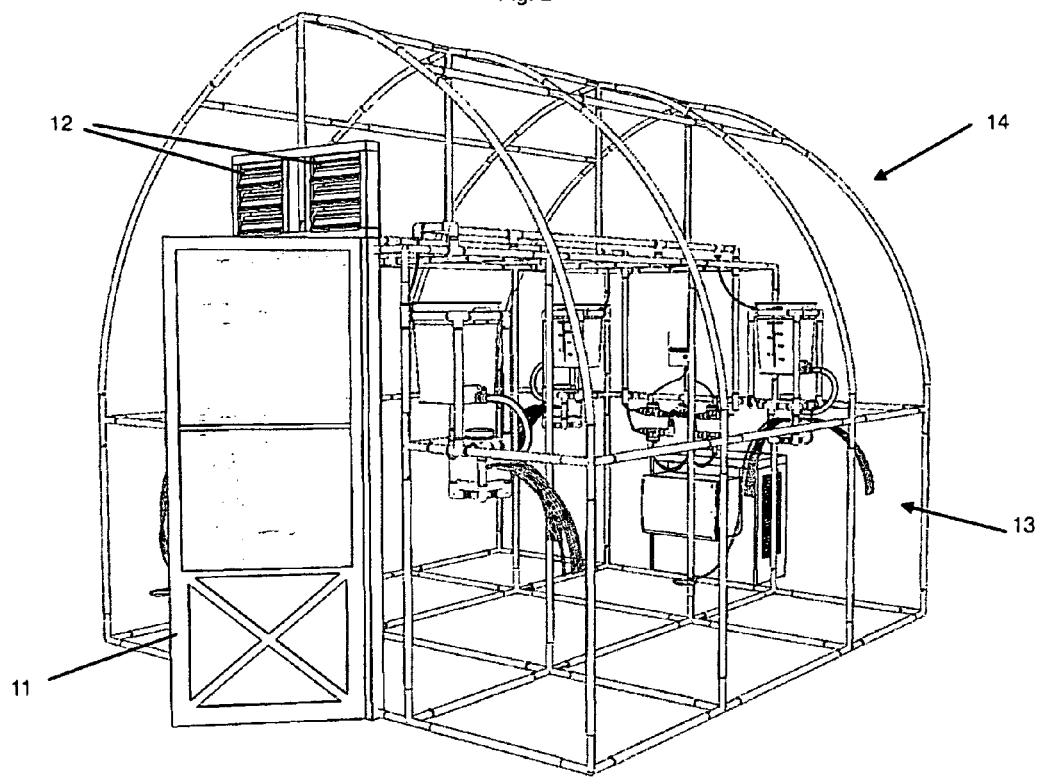
FIG. 2 is an exterior 45-degree side view of the present invention.

Referring now to the invention in more detail, FIG. 1 and FIG. 2 show the exterior of a 10'×10' greenhouse from both a straight on view (FIG. 1) as well as from an offset view of about 45-degree (FIG. 2) angle. In some figures certain components of the present invention are omitted so that other components may be more clearly demonstrated. FIG. 1 shows a greenhouse from straight on as having a door 11 centered on the front of the greenhouse consisting of Building Skeletal Support Structure 14, a translucent or transparent cover 13. Exhalation vents 12 are positioned above the door and attached to the upper parts of the doorframe 11 and to the Building Skeletal Support Structure 14 of the greenhouse.

Referring to FIG. 1 and FIG. 2 in more detail, the insulated door 11 allows entry and exit to and from the greenhouse and provides structural rigidity by its 2×4 Composite post (FIG. 5) 33 doorframe anchored. In addition to this the door's internal windows allow for additional light entry in to the unit as well as additional air exchange through the windows' sliding capability. The Exhalation Vents 12 are mounted to the greenhouse and are opened by an increase of internal air pressure due to the forced outside air introduction from a cooling such as an evap-cooler or by opening the vents with a temp controlled mechanical arm system. These Exhalation Vents 12 let hot air out of the greenhouse in order to maintain an optimum temperature. The transparent or translucent cover 13 wraps the entire greenhouse Building Skeletal Support Structure 14 in either single or multiple layers and acts as an insulator, protective skin and to let light enter the greenhouse. Extra care has been given to the design and layout of the Building Skeletal Support Structure 14, to insure great strength in anticipation of snow load and heavy wind. The Building Skeletal Support Structure 14 is a component of the invention specifically built and designed to utilize a Galvanized Metal Internal Tubing 38 (FIG. 8) bonded with a sheath of impact and sun damage resistant Structural PVC 40 (FIG. 8) coupled with Galvanized Steel Adjustable Joints 39 (FIG. 8) to allow for immense structural strength and optimum design for long life in a greenhouse environment.

FIG. 2

FIG. 2 shows that of FIG. 1 only allowing for an expanded view of the side of the unit, with its transparent properties displaying the Building Skeletal Support Structure 14 in greater detail.

FIG. 3

Figure 3:
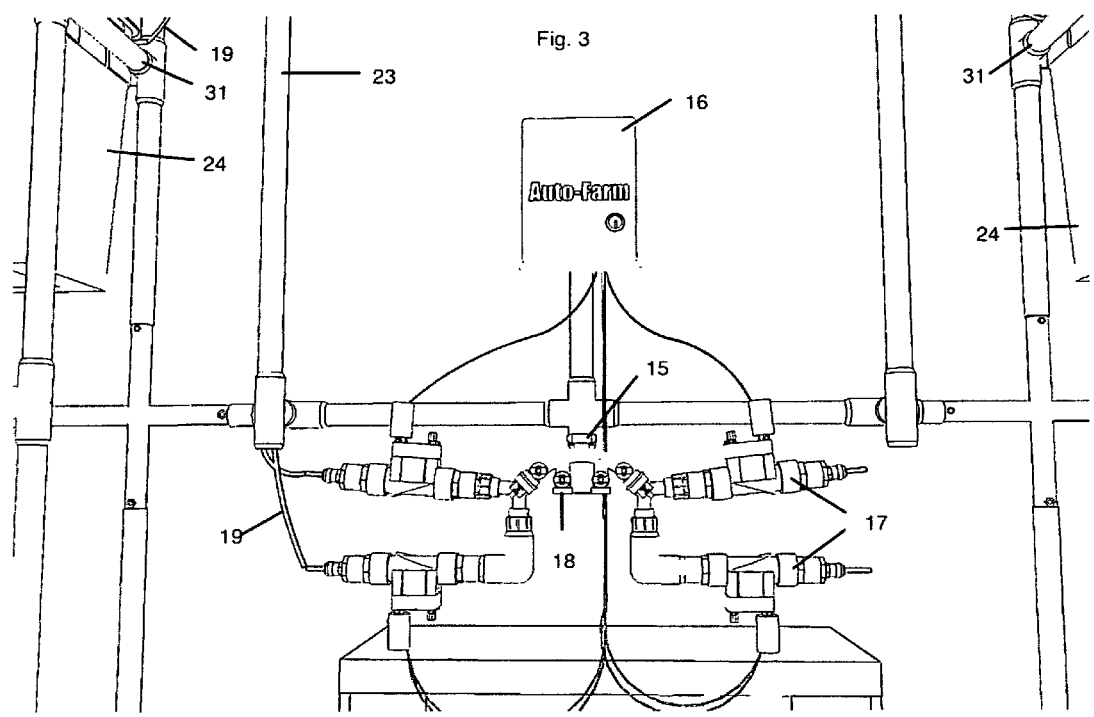
FIG. 3 is an interior view of the rear wall, and multiple zoned control system of the present invention.

Referring now to FIG. 3. The description of FIG. 3 shows part of the inner working of the invention. Notice a theme applied to the remainder of the description as one that follows the path of how the mechanism works, namely the flow of the device. First, the External Water Hose 15 brings water into the unit so that it can be distributed both in independent quantities and time layouts via Individual Bay Watering Lines 19 by the Variable Power Source Control Unit 16 capable of utilizing an AC or DC power source. The Variable Power Source Control Unit 16 gives the watering/feeding process not only the flexibility of water quantity control individually programmable per zone (of which there are four) but also allows for time of day choice, day frequency, and how many times a day. In addition to that by the Variable Power Source Control Unit 16 holding its own internal power source so that there is no direct need for an outside power source, when not available, for the unit to function. The Variable Power Source Control Unit 16 controls four independent Automated On/Off Water Valves 17 by informing them when to open and close in a programmable manner as described above in reference to frequency and quantity options. Also, attached to the Variable Power Source Control Unit 16 rear water feed is an On/Off Control Hose Splitter 18, which serves two purposes: one side of the On/Off Control Hose Splitter 18 allows for a manually controlled interior water spigot and the other side allows for the integration of Spring Hose Watering Wand 20. The Spring Hose Watering Wand 20 gives the invention user the ability to water and rinse the living vegetation within the Greenhouse to be "Foliage Fed", in other words to occasionally feed the plant through the dampening of the leaves themselves.

The Individual Bay Watering Lines 19 connect directly to the Automated On/Off Water Valves 17 then run internally thru the hollow Building Skeletal Support Structure 14 to each Reservoir 24 keeping them clear of useable space within the Greenhouse. There are four Reservoirs 24 mounted upon the individual Tower Support Structures 31, of which there are also four. Before an Individual Bay Watering Line 19 reaches a Reservoir 24 there has been installed a Individual Bay Watering Line On/Off Valve 22 allowing for the each Reservoirs 24 water flow to not only be reduced but also turned off if the invention user chooses.

FIG. 4

Figure 4:
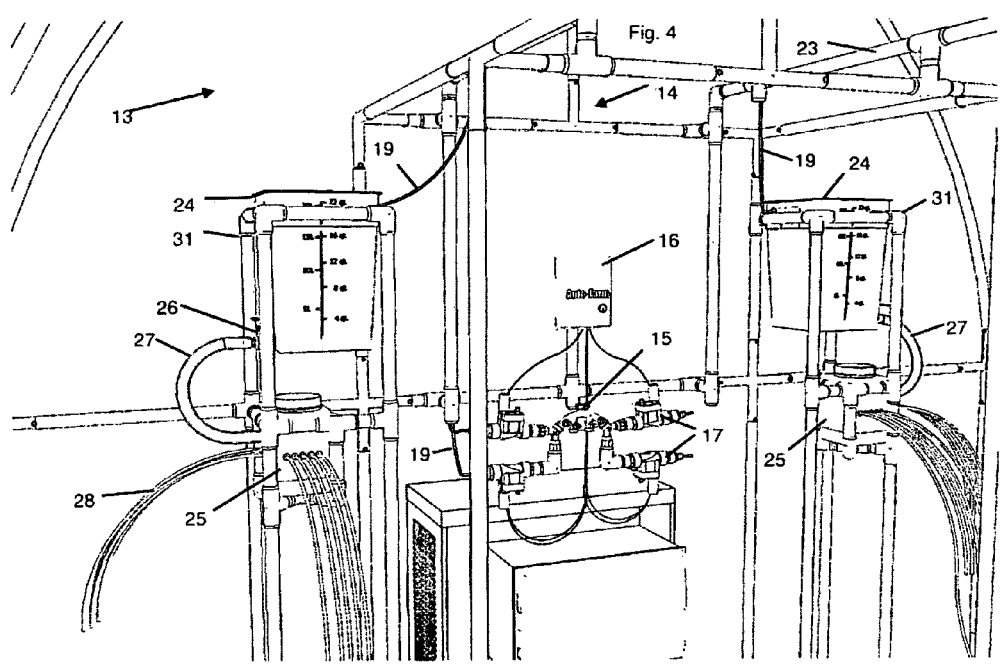
FIG. 4 is a perspective view of the interior including the nutrient tea brewing and irrigation distribution towers of the present invention.

Now referring to FIG. 4, the description will follow with the same theme of describing the invention taking its natural flow of operation with one detour now to touch on a non-process feature. The Invention is floored with an Interior Plant Resistant Flooring 30, eliminating the threat of outside plants growing up through the floor and infesting the Greenhouse. As the Invention is designed to be left alone for great expanses of time with no supervision and to care for the vegetation by itself in user absence it is important that this measure be taken as the user will not have to be around to protect the plants from outside weeds.

Figure 6:
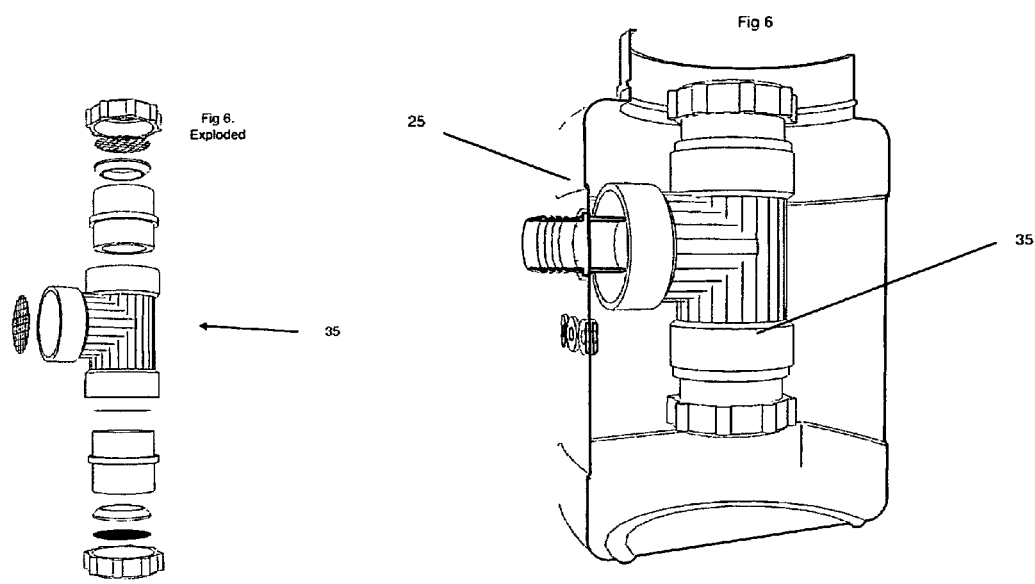
FIG. 6 is a perspective view of the nutrient tea infuser chamber of the present invention.

Following the process flow of the Invention notice in FIG. 4 that the Individual Bay Watering Lines 19 stemming from the Variable Power Source Control Unit 16 run thru the hollow Building Skeletal Support Structure 14 to each individual Tower Support Structure 31 so that all of the Individual Bay Irrigation Lines 19 are hidden away for a clean look, not in the way of user activities and protected from potential damage. Individual Bay Irrigation Lines 19 connect to the top of each assigned Reservoir 24 to allow for the receipt of the Time/Amount and Frequency Controlled payload of water. Connected to the Reservoir 24 is a mounted Reservoir On/Off Valve 26 allowing for the Reservoir 24 to hold water and be manually turned on and off if the Invention user chooses to do so. This allows for controlled plant feedings as each Reservoir 24 has exact liquid amount measurements labeled on the side. This will allow the user to mix exact amounts of feeding and fertilizing solutions within the Reservoir 24 before conducting a manual watering by turning the Reservoir On/Off Valve 26 to the on position. Once either a normal automated watering payload or manual watering payload leaves the Reservoir 24 pushed by both the internal pressure build up of the water entered into the sealed Reservoir 24 as well as the natural forces of gravity, it will travel thru the Reservoir Dump Hose 27 into the Nutrient Tea Brewer and Distribution Hub 25 filtering through the internally attached plant tea brewer/infuser capsule 35 (FIG. 6). The Nutrient Tea Brewer and Distribution Hub 25 is a sealed container that holds a plant tea brewer/infuser capsule 35 (FIG. 6) which contains within it the desired Plant Food Solution. The Plant Food Tea Brewer and Distribution Hub 25 is designed so that at all times it holds half of its volume in water, so that while the system is dormant the solution within the plant tea brewer/infuser capsule 35 (FIG. 6) "brews" with the remaining water creating an nutrient rich "tea" that will introduce itself equally to all of the invention's housed plants upon the next watering cycle via the Individual Plant Feeder Lines 28 that are connected directly into the sides of the Plant Food Tea Brewer and Distribution Hub 25. Once the Reservoir 24 dumps its water payload into the Food Tea Brewer and Distribution Hub 25 and mixes with the "brewed" plan nutrient solution the pressure of the introduced matter into the contained area and the natural physics of gravity and siphon cause the solution to travel thru the Individual Plant Feeder Lines 28 to the plant feeder/irrigation rings 29 which are connected at the ends of each Individual Plant Feeder Line 28. These plant feeder/irrigation rings 29 (Shown in more detail in FIG. 7 surround the stem of an individual plant allowing for an optimum watering placement directly to the plants roots system.

FIG. 5

Figure 5:
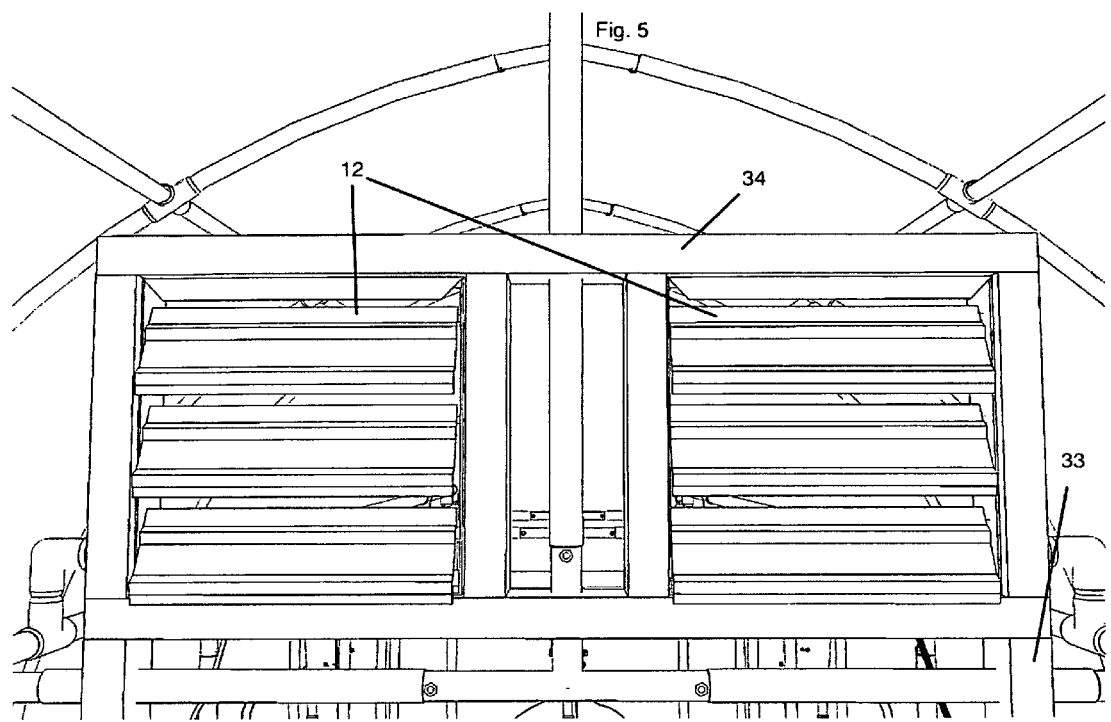
FIG. 5 is an exterior shot of the doorframe of the present invention.

Now referring to FIG. 5 in more detail you will see the 2×4 Composite Door Frame 33, which the Door 11 (Not Shown in FIG. 5) is attached to. This 2×4 Composite Door Frame 33 is set into the ground for a very rigid structure. Please take note the design of the invention calls for the Building Skeletal Support Structure 14 to be attached to into the 2×4 Composite Door Frame 33 so that the Building Skeletal Support Structure 14 naturally shares in the rigidity and strength. Atop the 2×4 Composite Door Frame 33 is mounted the 2×4 Vent Frame and Door Frame Cap 34. It caps the 2×4 Composite Door Frame 33 as well as creating housing for the two Exhalation Vents 12.

FIG. 6

FIG. 6 shows the full structure of the plant tea brewer/infuser capsule 35. It is designed to be filled with a water-soluble plant nutrient of your choosing by removing the base/lid utilizing a screw based clasp allowing for the lower chamber within the plant tea brewer/infuser capsule 35 to be filled with water-soluble plant nutrient. The plant tea brewer/infuser capsule 35 infuses the water with the water-soluble plant nutrient through natural osmosis and forced water flow, as being connected directly to the Reservoir Dump Hose 27 inlet creating a direct water flow through the plant tea brewer/infuser capsule 35 mounted within the Plant Food Tea Brewer and Distribution Hub 25 with the nutrient brew mixing within the Plant Food Tea Brewer and Distribution Hub 25 via two mesh screened outlets on the top and bottom of the plant tea brewer/infuser capsule 35 to be dispersed to the plants via Individual Plant Feeder Lines 28. by delivering the rich nutrient irrigation mix via forces of natural gravity and water pressure.

FIG. 7

Figure 7:
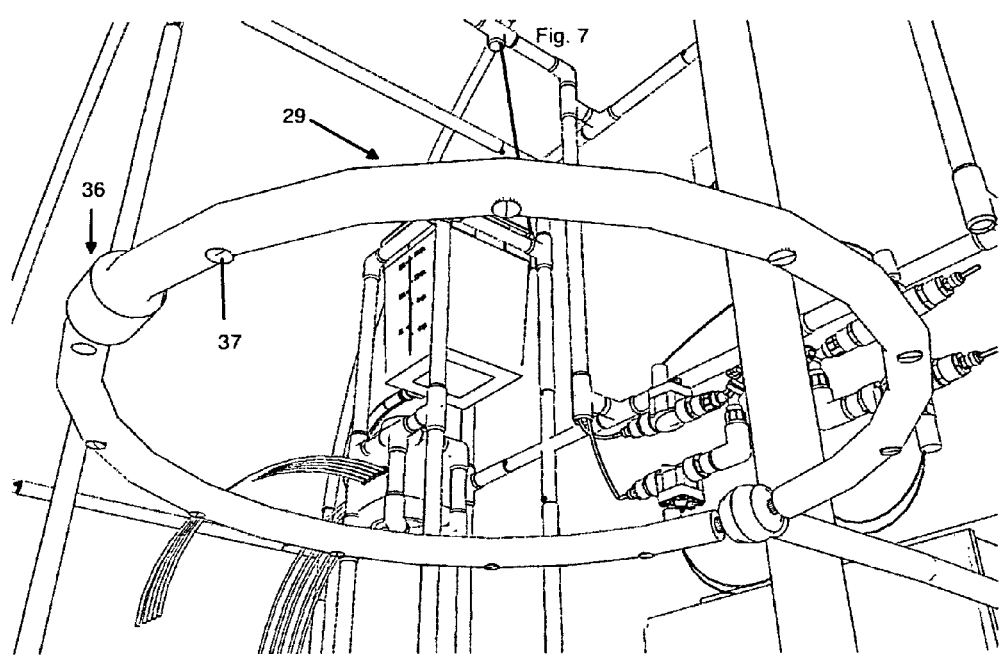
FIG. 7 is a perspective view of the plant feed/irrigation ring.

FIG. 7 shows in detail an "opened" plant feeder/irrigation ring 29. Each plant feeder/irrigation ring 29 is designed so that it can be opened and then closed around the base of a plant by its plant feeder/irrigation ring clasp 36 utilizing a fitted compression cup link or sheathing clasp. Also to be scene are the individual plant feed/irrigation ring water spout 37 running the length of the plant feeder/irrigation ring 29 which is where the water and plant feed solutions will extrude from so that it can be introduced directly to the plant root ball.

FIG. 8

Figure 8:
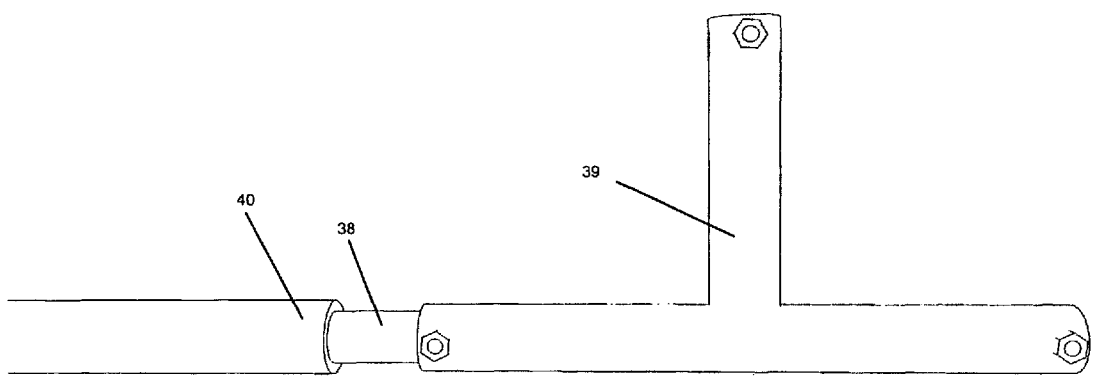
FIG. 8 is a perspective view of the PVC/Galvanized Metal structural components

FIG. 8 shows in detail the modular components of The Building Skeletal Support Structure 14 which has been specifically built and designed to utilize a Galvanized Metal Internal Tubing 38 (FIG. 8) bonded with an outer sheath of impact and sun damage resistant Structural PVC 40 (FIG. 8) coupled with Galvanized Steel Adjustable Joints 39 (FIG. 8) to allow for immense structural strength and optimum design for long life in a greenhouse environment as well the ease of assembly and disassembly.

The advantages of the present invention; the invention is an environmentally controlled greenhouse and integrated automated grow system that is self-sustainable and capable of producing a wide variety of organic crops concurrently. The system is broken into multiple/plurality of nutrient and irrigation delivery zones, which enables the operator of the system to create and maintain through automation the optimum-growing environment for a wide variety of crops.

Although capable of delivering any water-soluble nutrient to the plants, the system is designed to deliver organic nutrients that are made or harvested on site from a self-sustainable resource by the operator of the system. Examples of this nutrient could be vermi-compost, (harvested worm manure), or seaweed, or any variety of fully composted organic material.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A modular design greenhouse and grow system comprising:
    an external structure comprising a tubing frame, walls and a floor defining an enclosure, said enclosure including a doorframe and a door;
    an environmental control system connected to said enclosure;
    a programmable irrigation control and delivery system comprising at least a first respective watering line and at least a first corresponding nutrient brewing and distribution system, each said respective watering line having a first end connected to a water valve and a second end received by a respective corresponding reservoir, said nutrient brewing system having a hub with a volume, a capsule within said hub configured to contain a plant food solution and to brew and infuse liquid within said capsule with said plant food solution.

2. The modular design greenhouse and grow system of claim 1, further comprising, at least a first respective feeder line connected to said hub.

3. The modular design greenhouse and grow system of claim 2, further comprising, each said respective feeder line having an end portion proximate a plant within said enclosure.

* * * * *